US012467349B1

(12) United States Patent
Hinderliter

(10) Patent No.: US 12,467,349 B1
(45) Date of Patent: Nov. 11, 2025

(54) DUAL BLENDER SYSTEM FOR HYDRAULIC FRACTURE TREATMENTS

(71) Applicant: ProFrac Holdings II, LLC, Willow Park, TX (US)

(72) Inventor: Brandon N. Hinderliter, Willow Park, TX (US)

(73) Assignee: ProFrac Holdings II, LLC, Willow Park, TX (US)

( * ) Notice: Subject to any disclaimer, the term of this patent is extended or adjusted under 35 U.S.C. 154(b) by 0 days.

(21) Appl. No.: 18/771,215

(22) Filed: Jul. 12, 2024

(51) Int. Cl.
*E21B 43/26* (2006.01)
*B01F 23/50* (2022.01)
*B01F 35/71* (2022.01)
*B01F 101/49* (2022.01)

(52) U.S. Cl.
CPC ........ *E21B 43/2607* (2020.05); *B01F 23/565* (2022.01); *B01F 35/71731* (2022.01); *B01F 35/7176* (2022.01); *B01F 35/71775* (2022.01); *B01F 2101/49* (2022.01)

(58) Field of Classification Search
CPC ................ E21B 43/2607; B01F 23/565; B01F 35/71731; B01F 35/7176; B01F 35/71775; B01F 2101/49
See application file for complete search history.

(56) References Cited

U.S. PATENT DOCUMENTS

| | | | | |
|---|---|---|---|---|
| 8,177,411 | B2 | 5/2012 | Borgstadt | |
| 9,051,801 | B1 | 6/2015 | Mintz | |
| 10,920,553 | B2 | 2/2021 | Hodgson et al. | |
| 10,989,018 | B2 | 4/2021 | Oehler et al. | |
| 11,266,958 | B2 * | 3/2022 | Bishop | B01F 33/5013 |
| 2019/0249527 | A1 | 8/2019 | Kraynek | |
| 2023/0077170 | A1 | 3/2023 | Freemyer et al. | |

* cited by examiner

*Primary Examiner* — Matthew R Buck
(74) *Attorney, Agent, or Firm* — Henry Patent Law Firm PLLC

(57) ABSTRACT

In a general aspect, the present disclosure relates to a blender system for use in a hydraulic fracturing system. The blender system includes a mixing tub and a movable divider associated with the mixing tub. The divider is movable between an open position and a closed position. When the divider is in the open position, liquid can flow between a first portion of the mixing tub and a second, distinct portion of the mixing tub. When the divider is in the closed position, the divider prevents liquid flow between the first and second portions. A divider control system can move the divider between the open and closed positions. A first input pump pumps fluid into the first portion of the mixing tub, and a first output pump pumps fluid from the first portion of the mixing tub. A second input pump pumps fluid into the second portion of the mixing tub, and a second output pump pumps fluid from the second portion of mixing tub.

28 Claims, 6 Drawing Sheets

DUAL BLENDER SYSTEM FOR HYDRAULIC FRACTURE TREATMENTS

BACKGROUND

The following description relates to a dual blender system for hydraulic fracture treatments.

Fracture treatments have been used to stimulate the transfer of hydrocarbon resources from a subterranean formation. Fracture treatments typically introduce a pressurized fracture treatment fluid into the subterranean formation through a wellbore. The pressurized fracture treatment fluid can fracture the subterranean formation, and proppant material in the fracture treatment fluid can help stabilized the fractures.

DETAILED DESCRIPTION

Figure 1:
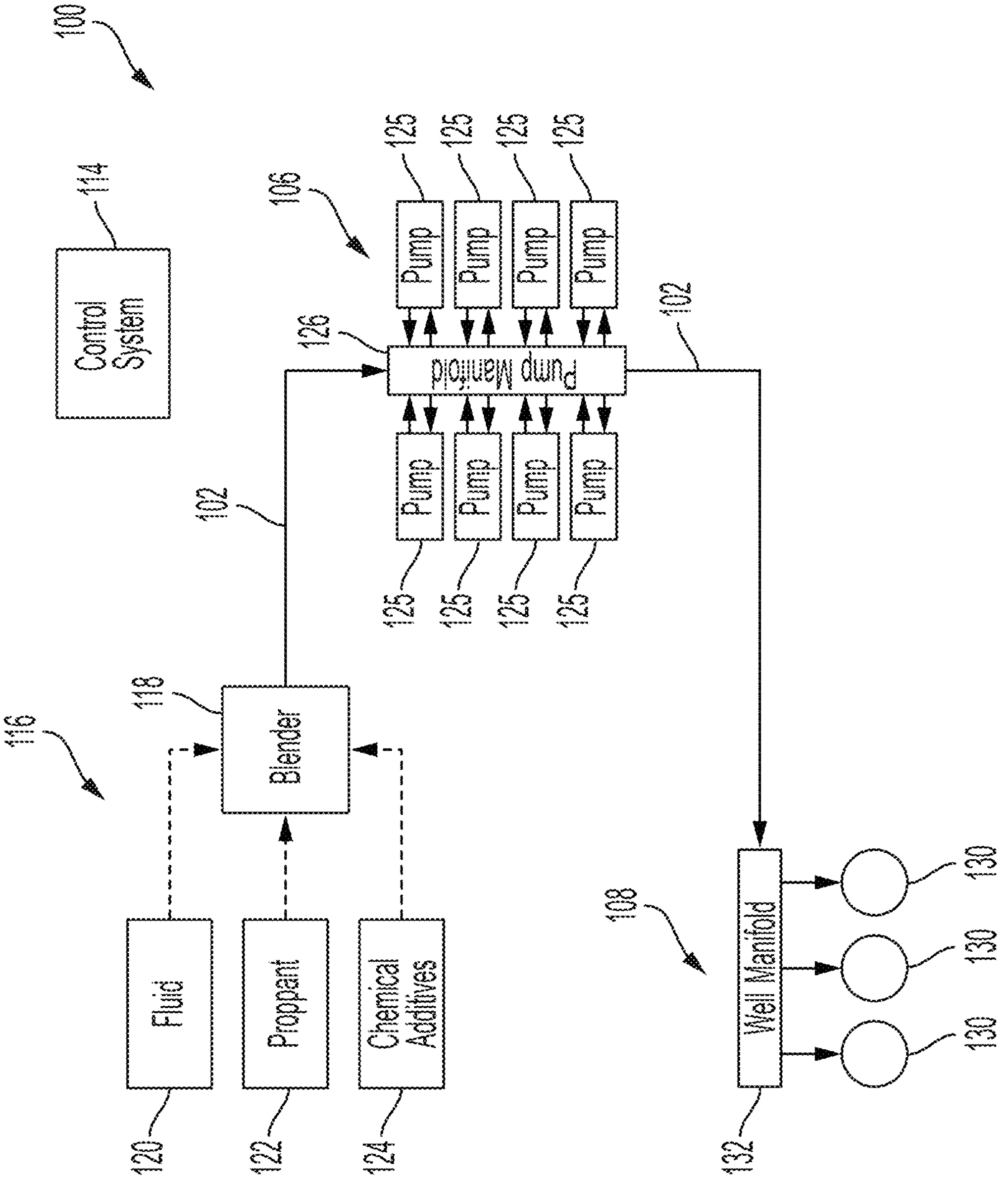
FIG. 1 is a schematic diagram of an example fracture treatment system.

In some aspects of what is described here, a blender system that is used with a hydraulic fracture treatment system can operate in multiple distinct modes of operation. Use of the blender system in a plurality of operating modes facilitates the blender system being adaptable to a wide variety of well configurations and chemistry requirements. For instance, a blender system may be adaptable for different modes of use with multiple wellbores in well system. In some cases, a blender system can change between distinct modes of operation in the field, for example, at a well site, without having to transport the blender system or replace component parts.

In some implementations, a blender system has multiple distinct input channels and multiple distinct output channels, and each mode of operation can use the input and output channels in a different manner. For instance, a blender system may switch between two or more of the following modes of operation: (1) a "dual fracturing mode" in which the blender system mixes two distinct fracture treatment fluid chemistries and outputs the distinct fracture treatment fluid chemistries through two distinct output channels (e.g., for subterranean injection through two distinct wellbores); (2) a "simul-fracturing mode" in which the blender system mixes a single fracture treatment fluid chemistry and outputs the same fracture treatment fluid chemistry through two distinct output channels (e.g., for subterranean injection through two distinct wellbores); and (3) a "single fracturing mode" in which the blender system mixes a single fracture treatment fluid chemistry and outputs the fracture treatment fluid chemistry through a single output channel (e.g., for subterranean injection through a single wellbore). Other modes of operation may be possible.

In some implementations, the blender system uses the same mixing tub for each mode of operation, and the mixing tub can be configured (and reconfigured) for each mode of operation. In some examples, the mixing tub has a movable divider that can be disposed in an interior volume of the mixing tub to separate the internal volume into a first portion and a second portion. In some implementations, the divider can move between an open position and a closed position. When the movable divider is in the open position, the first and second portions of the internal volume of the mixing tub are joined so that fluid can flow freely between the first and second portions. For instance, fluid present in the first portion can mix and interact with fluid present in the second portion. When the movable divider is in the closed position, the first portion and second portion of the internal volume are divided so that fracture treatment fluid in the first portions is isolated from fracture treatment fluid in the second portion. For example, when the divider is in the closed position, fracture treatment fluid present in the first portion does not mix or interact with fracture treatment fluid present in the second portion. In some implementations, movement of the divider is controlled by a divider control system. In some implementations, the divider control system is a motorized system (e.g., an electric linear actuator, an electric motor, a pneumatic actuator, etc.). In various implementations, the divider control system may be, for example, a manual actuator such as, for example, a hand crank. In some cases, moving the divider to the open position may include removing the divider from the mixing tub. The blender system may include other features and components (e.g., crossovers, valves, manifolds, etc.) that can be configured and reconfigured for each mode of operation.

In some examples, a base fluid such as, for example, water is added to the mixing tub by operation of an input pump. In some implementations, a first input pump directs fluid to the first portion of the interior volume of the mixing tub and a second pump directs fluid to the second portion of the interior volume of the mixing tub. In some implementations the first input pump and the second input pump may receive fluid from a common fluid source. In other implementations, the first input pump and the second input pump may receive fluid from different fluid sources.

In some implementations, the blender system includes a hopper that contains a proppant. In some implementations, the proppant may include particulate solids such as, for example, sand, glass beads, ceramic material, bauxite, dry powders, rock salt, benzoic acid, fiber material, cement plastics, or other materials. In some cases, the particulate solids may be coated with a curable resin, a pre-cured resin, a stress bond resin, or other adhesive compound. When mixed with water or another base liquid, the proppant material may form a suspension in the fracture treatment fluid. In some implementations, the hopper may be selectively dividable thereby facilitating the storage and separation of proppants having differing chemistry or granule size.

In some implementations, one or more chemical pumps may introduce additives to the fracture fluid. In various implementations, a first chemical pump may introduce additives to the first portion and a second chemical pump may introduce additives to the second portion of the interior volume of the mixing tub. In various implementations, the additives may include, for example, friction reducing compounds surfactants, acids, corrosion inhibitors, scale inhibitors, or other types of additives. In various implementations, the additives may be liquid chemicals or solid dry powders.

Hydraulic fracture treatments can be used to stimulate the production of hydrocarbon resources (e.g., oil, natural gas, etc.) from subterranean rock formations. During a fracture treatment, fracture treatment fluids are pumped under high pressure into the subterranean rock formation through a wellbore to fracture the formation and increase permeability and production from the formation. The fracture treatment fluid may include a proppant material such as, for example, sand, glass beads, ceramic material, bauxite, dry powders, rock salt, benzoic acid, fiber material, cement plastics, or other materials. In many systems, proppant is mixed with other additive materials.

In some instances, a blender system can operate in a "dual fracturing mode" of operation. In some examples of a "dual fracturing mode", a divider is placed in a closed position in an interior volume of a mixing tub, such that the divider effectively divides the interior volume into two distinct portions-a first portion and a second portion. A first fluid is directed into the first portion of the interior volume of the mixing tub, and a second fluid is directed into the second portion of the interior volume of the mixing tub. In various implementations, the first fluid and the second fluid are the same fluid (and may be received from the same fluid source); or the first fluid and the second fluid may be different from each other (e.g., received from different fluid sources). The first and second fluids may be pumped into the interior volume by independent input pumps that are independently controlled; a crossover valve between the input pumps' intake (suction) manifolds may be closed during this mode of operation. Proppants and additives can be added to the first fluid and the second fluid in the mixing tub. In some implementations, the same proppants and additives may be added to the first fluid and the second fluid; however, in other implementations, different proppants and additives may be added to the first fluid and to the second fluid. The divider prevents mixing of the first fluid with the second fluid. Thus, a first fracture treatment fluid may be mixed in the first portion, and a second fracture treatment fluid, with a different chemistry, may be mixed in the second portion. The first fracture treatment fluid may then be directed to a first wellbore, and the second fracture treatment fluid may be directed to a second wellbore. The first and second fracture treatment fluids may be pumped from the interior volume by independent output pumps that are independently controlled; for example, a crossover valve between the output pumps' discharge manifolds may be closed during this mode of operation.

In some instances, the blender system can operate in a "simultaneous fracturing mode" of operation. In some examples of a "simultaneous fracturing mode", the divider associated with the mixing tub is moved to an open position, such that the first and second portions of the interior volume are joined, effectively forming a single mixing volume. Fluid is directed into the interior volume of the mixing tub. In various implementations, the fluid may be supplied by one or both of the first input pump and the second input pump. For example, the crossover valve between the input pumps' intake (suction) manifolds may be open during this mode of operation. In other implementations, the first input pump and the second input pump may provide different fluids to the interior volume of the mixing tub. Proppant may be added to the mixing tub. In various implementations a chemical additive may be added to the mixing tub by one or more chemical pumps. In various implementations, the additives may be liquid chemicals or solid dry powders. A fracture treatment fluid is mixed in the interior volume of the mixing tub, and the fracture treatment fluid may be supplied to multiple wellbores that utilize the same fracture treatment fluid chemistry. In some cases, a crossover valve between the output pumps' discharge manifolds may be open or closed during this mode of operation.

In some instances, the blender system can operate in a "single fracturing mode" of operation. In some examples of a "single fracturing mode", the divider can be in either the open or closed position, while only one of the input pumps and one of the output pumps operates. For example, the first input pump and the first output pump may operate while the second input pump and the second output pump are on standby (e.g., for back up). In a "single fracturing mode", fracture treatment fluid may be mixed in one of the isolated portions of the mixing tub (e.g., in the first portion) with the divider in the closed position, or fracture treatment fluid may be mixed in the joined interior volume of the mixing tub (e.g., including both the first and second portions) with the divider in the open position. In some cases, the crossover valve between the first and second input pumps' suction manifolds may be closed during this mode of operation, and the crossover valve between the first and second output pumps' discharge manifolds may also be closed during this mode of operation.

FIG. 1 is a schematic diagram of an example hydraulic fracturing system 100. As shown in FIG. 1, the example hydraulic fracturing system 100 includes a pump system 106, a well system 108 and a fracture treatment fluid source 116. The various components and subsystems of the hydraulic fracturing system 100, which may include pipes, hoses, tubes, fluid tanks, pumps, valves, motors, mixers, generators, transformers, computer systems, or other types of structures and equipment, can be deployed on trucks, trailers, mobile vehicles, immobile installations, skids, etc. The hydraulic fracturing system 100 may include additional features and subsystems, and the components of the hydraulic fracturing system 100 may be arranged in another manner. In various implementations components of the example hydraulic fracturing system such as, for example, the blender system 118, the pump system 106, and the well system 108 may be driven by one or more prime movers. In various implementations, the prime movers may be, for example, electric motors, diesel motors, natural gas motors, hydraulic motors, or combinations thereof.

In some implementations, the example hydraulic fracturing system 100 includes one or more control systems 114. The control systems 114 can include one or more computing devices or systems associated with the pump system 106, the well system 108, the fracture treatment fluid source 116, or other components of the hydraulic fracturing system 100. The control system 114 may include computing devices or systems that are separate from the components shown in FIG. 1, for example, in a data van, at a remote data center or in the cloud.

In some implementations, the control system 114 can monitor and control the fracture treatment applied by the hydraulic fracturing system 100. In some instances, the control system interfaces with controls of the hydraulic fracturing system 100. For example, the control system may initiate control signals that configure the pump system 106, the well system 108, the fracture treatment fluid source 116, or other components of the hydraulic fracturing system 100 to execute aspects of a fracture treatment. The control system may receive data collected or generated by the hydraulic fracturing system 100, and the control system may process the data or otherwise use the data to select or modify parameters of a fracture treatment. The control system 114 may initiate control signals that configure or reconfigure components of the hydraulic fracturing system 100 or other equipment based on selected or modified properties.

The example hydraulic fracturing system 100 may also include communication links that allow various components and subsystems of the hydraulic fracturing system 100 to communicate with each other. For example, the hydraulic fracturing system 100 may include communication links that allow the control systems to communicate with components of the pump system, the well system 106, the fracture treatment fluid source 116, etc. The communication links may also allow communication with sensors or data collection apparatus, remote systems, equipment installed in the wellbore, and other devices and equipment. The communication links may include any type of communication channels or networks, for example, to facilitate communication via wireless or a wired network, the Internet, a WiFi network, a satellite network, or another type of data communication network.

The example fracture treatment fluid source 116 includes a blender system 118 that mixes constituents of the fracture treatment fluid 102, such as water 120, a proppant material 122, and chemical additives 124 such as, for example, friction reducers, surfactants, acids, corrosion inhibitors, scale inhibitors, or other types of chemical additives. The proppant material 122 may include particulate solids such as, for example, sand, glass beads, ceramic material, bauxite, dry powders, rock salt, benzoic acid, fiber material, cement plastics, or other materials. In some cases, the particulate solids may be coated with a curable resin, a pre-cured resin, a stress bond resin, or other adhesive compound. When mixed with water, the proppant material 122 may form a suspension in the fracture treatment fluid 102.

The example pump system 106 includes multiple pumps 125 and a pump manifold 126. The pump manifold 126 is in fluid communication with the fracture treatment fluid source 116, and receives the fracture treatment fluid produced by the blender system 118 of the fracture treatment fluid source 116. The pump manifold 126 is configured to connect the plurality of pumps 125 to a fluid flow path through the pump manifold 126. The plurality of pumps 125 are configured to increase a pressure of the fracture treatment fluid 102 along the fluid flow path. As such, an outlet pressure of the fracture treatment fluid 102 when exiting the pump manifold 126 is greater than an inlet pressure of the fracture treatment fluid 102 when entering the pump manifold 126. For illustration purposes, in some examples, the fracture treatment fluid 102 may exit the fracture treatment fluid source 116 at or around 100 psi, and the fracture treatment fluid 102 may exit the pump system 106 at or above 15,000 psi. The plurality of pumps 125 may be implemented using any suitable type of hydraulic fracturing pumps, including electric-powered pumps or diesel-powered pumps.

In some implementations, control system 114 includes one or more data processors that perform operations by executing software, firmware or another type of computer code or machine-readable instructions. The data processors can include any type of data processing apparatus such as, for example, general-purpose microprocessors, electronic controllers, special-purpose logic circuitry, etc. Software or other computer programs may generally be written in any form of programming language, and may be executed on one computer or on multiple computers that are located at one site or distributed across multiple sites and interconnected by a communication network.

The example well system 108 includes one or more wellbores in a subterranean region. The well system 108 may include any combination of horizontal, vertical, slant, curved, or other wellbore orientations. The subterranean region may include a rock formation that contains hydrocarbon resources, such as oil, natural gas, or others. For example, the subterranean region may include shale, coal, sandstone, granite, or others. The well system 108 can communicate fracture treatment fluid into the subterranean region, for example, through conduits installed in the wellbores. The conduits may include casing cemented to the walls of the wellbore, or other types of conduit such as sectioned pipe or coiled tubing. In some implementations, all or a portion of the wellbores may be left open, without casing.

As shown in FIG. 1, the example well system 108 includes a plurality of well heads 130 and a well manifold 132. The well manifold 132 is in fluid communication with the conduit 104 and receives the fracture treatment fluid 102 from the conduit 104. Moreover, in some variations, the well manifold 132 is configured to connect the plurality of well heads 130 to a fluid flow path through the well manifold 132. In these variations, the well manifold 132 may be configured to supply the fracture treatment fluid 102 from the conduit 104 to each well head 130 to be communicated into the respective wellbores. In some implementations, the plurality of well heads 130 are associated with wellbores that each have a casing therein. In other implementations, the wellbores associated with the plurality of well heads 130 may be uncased.

During operation of the example hydraulic fracturing system 100, the blender system 118 may blend the water 120, the proppant material 122, and the chemical additives 124 to produce the fracture treatment fluid 102. Moreover, the pump system 106 pumps the fracture treatment fluid 102 from the fracture treatment fluid source 116 through the pump manifold 126 toward the well system 108. The well system 108 may also transfer the received facture treatment fluid through the well manifold 132 towards the plurality of well heads 130, into the associated wellbores to fracture the subterranean formation.

Figure 2:
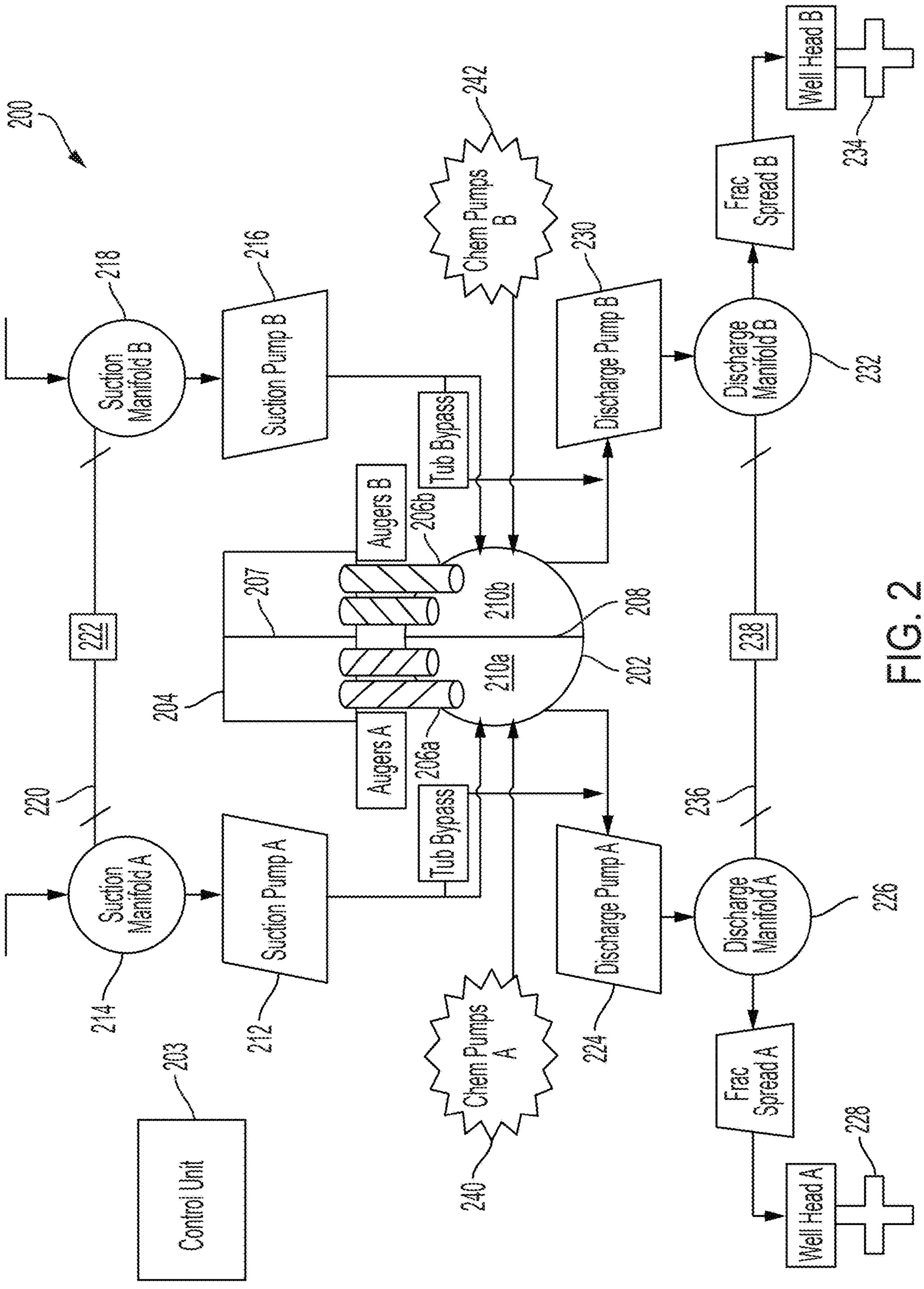
FIG. 2 is a schematic diagram of an example blender system in a first mode of operation.

FIG. 2 is a schematic diagram of an example blender system 200 in a first mode of operation. The example blender system 200 includes a mixing tub 202. A hopper 204 is disposed with the mixing tub 202 and is coupled to the mixing tub 202 by at least one transport system 206. In various implementations, the hopper 204 is disposed adjacent to the mixing tub 202; however, in other implementations the hopper 204 may be located at a distance from the mixing tub 202. In various implementations the transport system 206 includes an auger; however, in other implementations, the transport system 206 may be, for example, a conveyor, a chute, or another type of transport device. In various implementations, the transport system 206 includes at least two augers; however, as illustrated in FIG. 2, the transport system 206 may include any number of augers or other devices. During operation, the hopper 204 contains a proppant such as, for example, sand or any other type of proppant described above with respect to FIG. 1. The transport system 206 transports the proppant from the hopper 204 to the mixing tub 202. In various implementations, the transport system 206 may transport a metered amount of proppant from the hopper 204 to the mixing tub 202 responsive to a control signal received from a control unit 203. In other implementations, the transport system 206 may be manually actuated.

In various implementations, the control unit 203 may be the control system 114 described with respect to FIG. 1. In some variations, the control unit 203 communicates with, or is deployed as part of, a control system in the example blender system 200. For instance, the control unit 203 may communicate with a data truck or another type of control system.

In some implementations, the control unit 203 and other control systems in the example blender system 200 include one or more data processors that perform operations by executing software, firmware or another type of computer code or machine-readable instructions. The data processors can include any type of data processing apparatus such as, for example, general-purpose microprocessors, electronic controllers, special-purpose logic circuitry, etc. Software or other computer programs may generally be written in any form of programming language, and may be executed on one computer or on multiple computers that are located at one site or distributed across multiple sites and interconnected by a communication network.

The mixing tub 202 includes a divider 208. The divider 208 is movable between an open position and a closed position. When in the closed position, the divider 208 separates an internal volume of the mixing tub 202 into a first portion 210*a* and a second portion 210*b*. When the divider 208 is in the closed position, fluid introduced to the first portion 210*a* does not mix or interact with fluid introduced to the second portion 210*b*. In various implementations, the first portion 210*a* and the second portion 210*b* are approximately equal to each other. That is, the divider 208 divides the internal volume of the mixing tub 202 approximately in half. In other implementations, a volume of the second portion 210*b* may be, for example, larger or smaller that a volume of the first portion 210*a*.

When in the open position, fluid introduce into the first portion 210*a* mixes and interacts with fluid introduced to the second portion 210*b* such that the interior volume 210 of the mixing tub 202 is continuous. In various implementations, the divider 208 is moved between the open position and the closed position by operation of a divider control system. In various implementations, the divider control system may be a manual actuator such as, for example, a hand crank. In other implementations, the divider control system may be, for example, a linear actuator, a pneumatic actuator, or an electric motor that receives control signals from the control unit 203. In some implementations, the divider 208 may be fully removed from the mixing tub 202 when in the open position. In other implementations, the divider 208 is not fully removed from the mixing tub 202 when in the open position such that the divider 208 remains coupled to the mixing tub 202.

The hopper 204 includes a second divider 207. The second divider 207 is movable between an open position and a closed position. When in the closed position, the second divider 207 separates an internal volume of the hopper 204 into a first portion and a second portion. When the second divider 207 is in the closed position, proppant introduced to the first portion does not interact with proppant introduced to the second portion. In various implementation, the first portion and the second portion are approximately equal to each other; however, in other implementations, the first portion may be, for example, larger or smaller than the second portion. In various implementations, the second divider 207 is moved between the open position and the closed position by operation of a manual actuator such as, for example, a hand crank. In other implementations, the second divider 207 may be actuated by, for example, a linear actuator that receives control signals from the control unit 203. In some implementations, the second divider 207 may be fully removed from the hopper 204 when in the open position.

The transport system 206 delivers proppant to both the first portion 210*a* and the second portion 210*b* when the divider 208 is in the closed position. As illustrated in FIG. 2, in various implementations the transport system 206 may include at least one auger disposed on each side of the divider 208 (augers 206*a* and 206*b*). In various implementations, the augers 206*a* and 206*b* may be independently controlled to facilitate delivery of differing amounts of proppant to the first portion 210*a* and the second portion 210*b* of the mixing tub 202.

The example blender system 200 includes a first input pump 212 that is coupled to a first input manifold 214. The first input manifold 214 receives fluid such as, for example, water from a first fluid source. The first input pump 212 directs the fluid to the mixing tub 202 such that, when the divider 208 is in the closed position, the fluid discharged from the first input pump 212 is directed to the first portion 210*a* of the interior volume of the mixing tub 202. A second input pump 216 is coupled to a second input manifold 218. The second input manifold 218 receives fluid such as, for example, water from a second fluid source. In various implementations the first fluid source and the second fluid source may be the same; however, in other implementations, the first fluid source and the second fluid source may be different. The second input pump 216 directs the fluid to the mixing tub 202 such that, when the divider 208 is in the closed position, the fluid discharged from the second input pump 216 is directed to the second portion 210*b* of the interior volume of the mixing tub 202.

An input crossover conduit 220 is coupled to the first input manifold 214 and the second input manifold 218. A valve 222 is disposed in the input crossover conduit 220 such that the input crossover conduit may be selectively opened or closed. When the valve 222 is open, the input crossover conduit 220 facilitates transfer of fluid between the first input manifold 214 and the second input manifold 218. In this arrangement, the first input manifold 214 and the second input manifold 218 may receive fluid from a single fluid source. When the valve 222 is closed, the first input manifold 214 is isolated from the second input manifold 218.

The example blender system 200 includes a first output pump 224 that is coupled to a first output manifold 226. The first output pump 224 receives mixed fracture treatment fluid dispensed from the mixing tub 202 and the first output manifold 226 directs the mixed fracture treatment fluid to at least one first wellbore 228. When the divider 208 is in the closed position, the first output pump 224 receives mixed fracture treatment fluid from the first portion 210*a* of the interior volume of the mixing tub 202. A second output pump 230 that is coupled to a second output manifold 232. The second output pump 230 receives mixed fracture treatment fluid dispensed from the mixing tub 202 and the second output manifold 232 directs the mixed fracture treatment fluid to at least one second wellbore 234. When the divider 208 is in the closed position, the second output pump 230 receives mixed fracture treatment fluid from the second portion 210*b* of the interior volume of the mixing tub 202. When the divider 208 is in the open position, the first output pump 224 and the second output pump 230 receive homogenous mixed fracture treatment fluid dispensed from the continuous interior volume 210 of the mixing tub 202. In various implementations, first input pump 212, the second input pump 216, the first output pump 224, and the second output pump 230 may be, for example, rotary positive displacement pumps, reciprocating positive displacement pumps, or another type of pump.

An output crossover conduit 236 is coupled to the first output manifold 226 and the second output manifold 232. A valve 238 is disposed in the output crossover conduit 236 such that the output crossover conduit 236 may be selectively opened or closed. When the valve 238 is open, the output crossover conduit 236 facilitates transfer of fluid between the first output manifold 226 and the second output manifold 232. In this arrangement, the first output manifold 226 and the second output manifold 232 may discharge fracture treatment fluid to a single wellbore. When the valve 238 is closed, the first output manifold 226 is isolated from the second output manifold 232.

The example blender system 200 includes at least one first chemical pump 240 and at least one second chemical pump 242. The at least one first chemical pump 240 introduces at least one chemical to the first portion 210*a* of the mixing tub 202. The at least one second chemical pump 242 introduces at least one chemical to the second portion 210*b* of the mixing tub. In various implementations, the chemicals introduced by the at least one first chemical pump 240 and the at least one second chemical pump 242 may include, for example, friction reducing compounds or other types of additives. In various implementations, the chemicals introduced by the at least one first chemical pump 240 and the at least one second chemical pump 242 may be liquid chemicals and the at least one first chemical pump 240 and the at least one second chemical pump 242 may be, for example, a rotary positive displacement pump, a reciprocating positive displacement pump, or another type of pump. In other implementations, the chemicals introduced by the at least one first chemical pump 240 and the at least one second chemical pump 242 may be solid chemicals such as dry powders and the at least one first chemical pump 240 and the at least one second chemical pump 242 may be, for example, an auger that transports the chemicals to the mixing tub 202.

During operation of the example blender system 200 in the first mode of operation, the divider 208 and the second divider 207 are moved to the closed position. The valve 222 in the input crossover conduit and the valve 238 in the output crossover conduit are closed. The first input pump 212 introduces a first fluid that is received from a first fluid source to the first portion 210*a* of the mixing tub 202. The first auger 206*a* conveys proppant from the hopper 204 to the first portion 210*a*. The proppant is mixed with the first fluid in the first portion 210*a*. The first chemical pump 240 introduces a first chemical additive to the first portion 210*a*. The first fluid, the proppant, and the first chemical additive are combined in the first portion 210*a* of the interior volume of the mixing tub 202 to form a first fracture treatment fluid. The first output pump 224 receives the first fracture treatment fluid dispensed from the first portion 210*a* of the mixing tub 202. The first fracture treatment fluid is conveyed through the first output manifold 226 and to the at least one first wellbore 228.

The second input pump 216 introduces a second fluid that is received from a second fluid source to the second portion 210*b* of the mixing tub 202. In various implementation, the second fluid may be the same or different from the first fluid and the second fluid source may be the same or different from the second fluid source. The second auger 206*b* conveys proppant from the hopper 204 to the second portion 210*b*. The proppant is mixed with the second fluid in the second portion 210*b*. The second chemical pump 242 introduces a second chemical additive to the second portion 210*b*. In various implementations, the second chemical additive is different from the first chemical additive; however, in other implementations the second chemical additive is the same as the first chemical additive. The second fluid, the proppant, and the second chemical additive are combined in the second portion 210*b* of the interior volume of the mixing tub 202 to form a second fracture treatment fluid. The second output pump 230 receives the second fracture treatment fluid dispensed from the second portion 210*b* of the mixing tub 202. The second fracture treatment fluid is conveyed through the second output manifold 232 and to the at least one second wellbore 234. In various implementations, the second fracture treatment fluid comprises a different chemical composition than the first fracture treatment fluid. The divider 208 prevents interaction of the first fracture treatment fluid with the second fracture treatment fluid in the mixing tub 202. In various implementations the at least one first wellbore 228 may include a plurality of wellbores that utilize the first fracture treatment fluid. The at least one second wellbore 234 may include a plurality of wellbores that utilize the second fracture treatment fluid.

Figure 3:
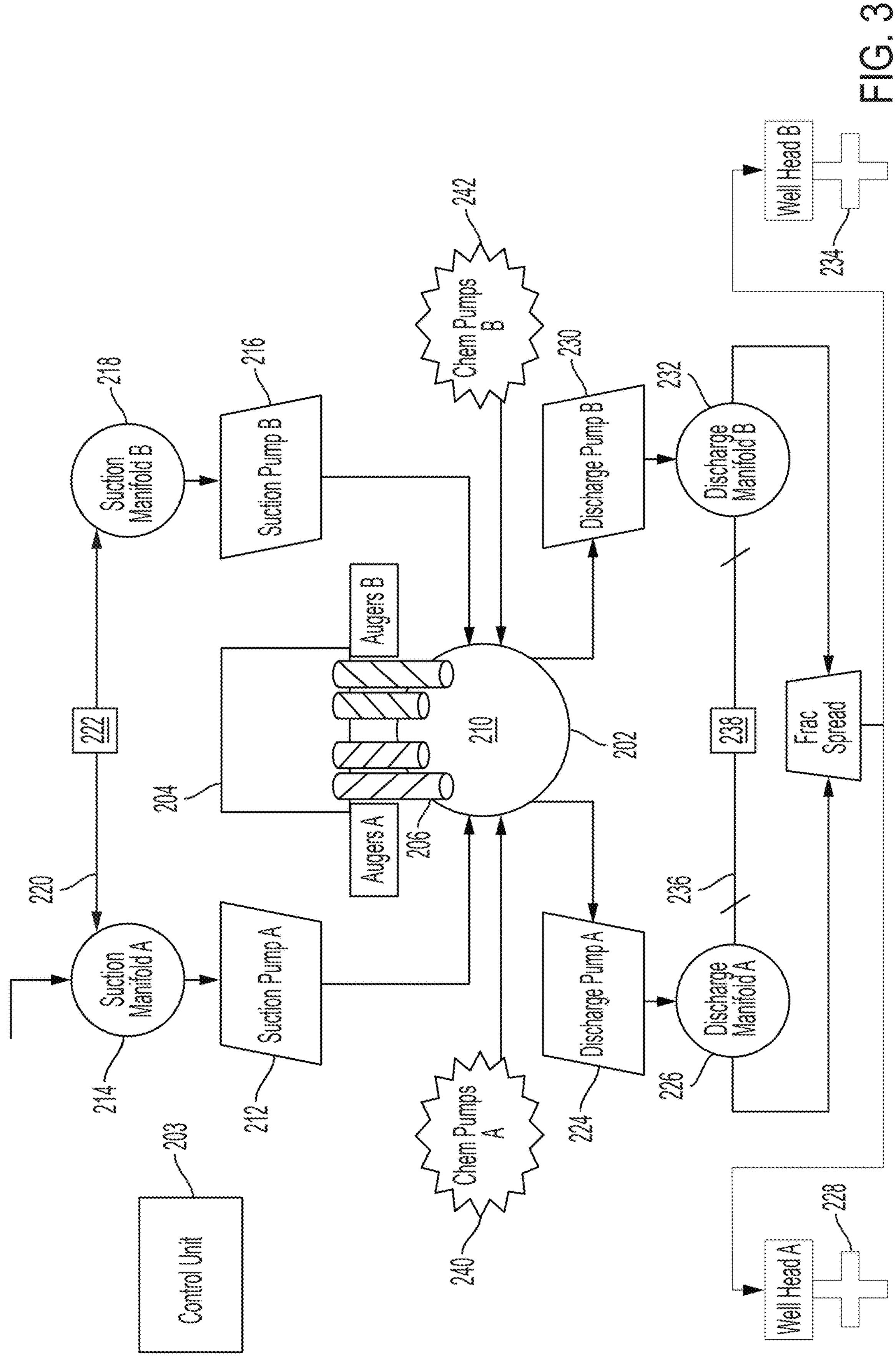
FIG. 3 is a schematic diagram of an example blender system in a second mode of operation.

FIG. 3 is a schematic diagram of the example blender system 200 in a second mode of operation. During operation of the example blender system 200 in the second mode of operation, the divider 208 and the second divider 207 are moved to the open position. The first input manifold 214 and the first input pump 212 receive a first fluid from a first fluid source. The first input pump 212 directs the first input fluid to the interior volume 210 of the mixing tub 202. The second input pump 216 introduces a second fluid to the interior volume 210 of the mixing tub 202. In various implementations, the second fluid is the same as the first fluid and is received from the first fluid source; however, in other implementations, the second fluid may be different from the first fluid and received from a second fluid source. In implementations where the second fluid is the same as the first fluid, the second input manifold 218 may receive the second fluid from the first input manifold 214 via the input crossover conduit 220. In this case, the valve 222 in the input crossover conduit 220 is open. The second input pump 216 introduces the second fluid to the interior volume 210 of the mixing tub 202. Because the divider 208 is in the open position, the first fluid mixes and interacts with the second fluid in the mixing tub 202.

The transport system transports proppant from the hopper 204 to the mixing tub 202. In implementations where the transport system includes the first auger 206*a* and the second auger 206*b*, the first auger 206*a* may transport a first proppant and the second auger 206*b* may transport a second proppant. In other implementations, the first auger 206*a* and the second auger 206*b* may transport the same proppant to the mixing tub 202. In still other implementations, at least one of the first auger 206*a* and the second auger 206*b* may not be utilized during operation of the example blender system 200 in the second mode of operation and may be used as a back up resource. The first chemical pump 240 directs a first chemical additive to the interior volume 210 of the mixing tub 202 and the second chemical pump 242 directs a second chemical additive to the interior volume 210 of the mixing tub 202. In various implementations, the first chemical additive may be the same as the second chemical additive. In other implementations utilizing multiple chemical additives, the first chemical additive and the second chemical additive may be different. In still other implementations, at least one of the first chemical pump 240 and the second chemical pump 242 may not be utilized during operation of the example blender system 200 in the second mode and may be reserved as a backup resource. The first fluid, the second fluid, the proppant, the first chemical additive, and the second chemical additive are combined in the mixing tub 202 to produce a fracture treatment fluid.

The first output pump 224 and the second output pump 230 direct the fracture treatment fluid from the mixing tub

202. The first output pump 224 directs the fracture treatment fluid through the first output manifold 226 and to at least one first wellbore. The second output pump 230 directs the fracture treatment fluid through the second output manifold 232 and to at least one second wellbore. In various implementations the at least one first wellbore 228 may include a plurality of wellbores that utilize the fracture treatment fluid. The at least one second wellbore 234 may include a plurality of wellbores that utilize the fracture treatment fluid. That is the chemistry of the fracture treatment fluid supplied to the at least one first wellbore 228 is the same as the chemistry of the fracture treatment fluid supplied to the at least one second wellbore 234. In various implementations, the first output pump 224 and the second output pump 230 may supply the fracture treatment fluid to a single wellbore. In various implementations one of the first output pump 224 and the second output pump 230 may not be utilized during operation in the second mode and may instead be reserved as a backup resource. In such implementations, the valve 238 in the output crossover conduit 236 may be opened allowing, for example, the second output manifold 232 to receive the fracture treatment fluid from the first output manifold 226.

Figure 4:
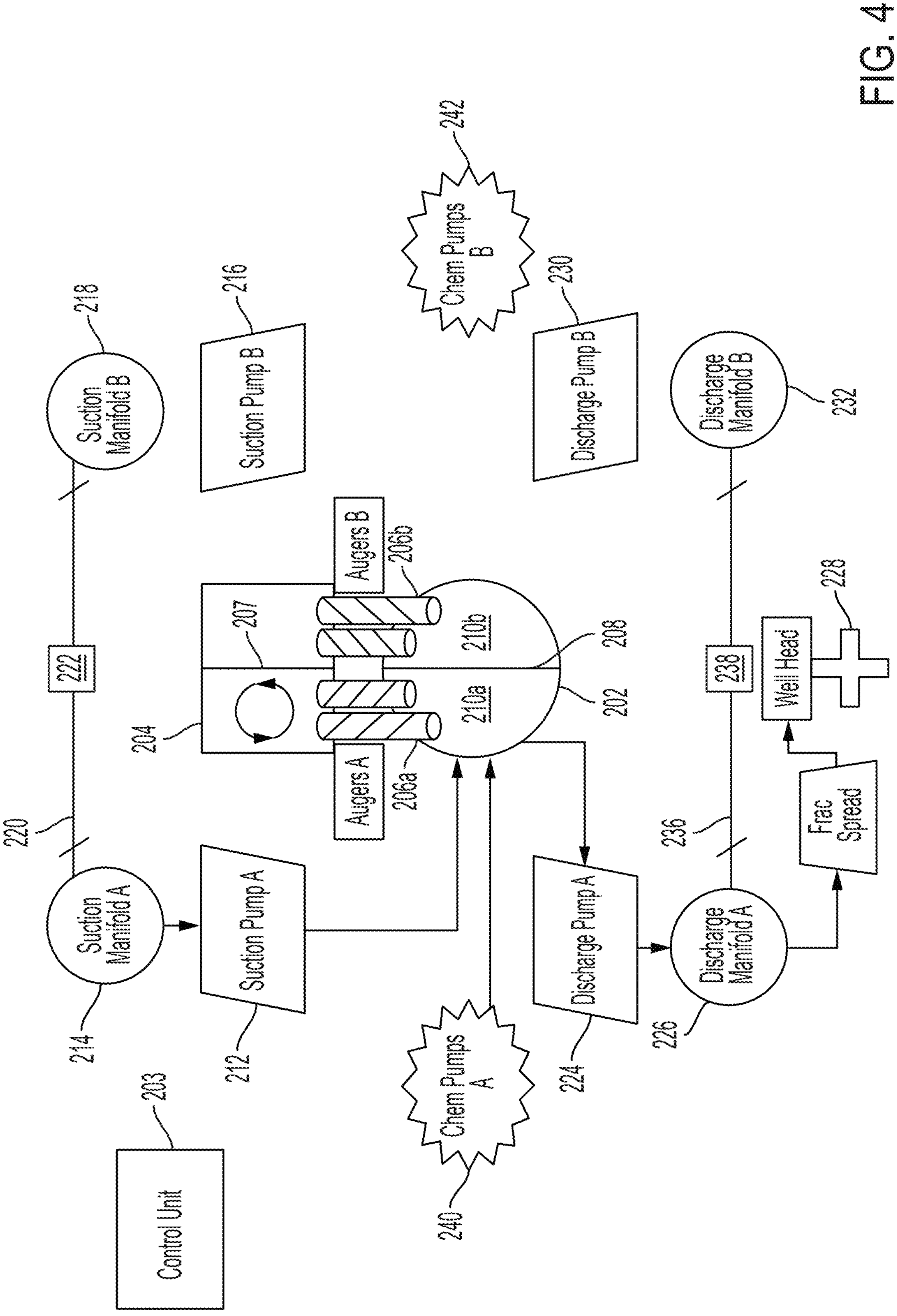
FIG. 4 is a schematic diagram of an example blender system in a third mode of operation.

FIG. 4 is a schematic diagram of the example blender system 200 in a third mode of operation. During operation of the example blender system 200 in the third mode of operation, the divider 208 and the second divider 207 are moved to the closed position and the valve 222 in the input crossover conduit 220 and the valve 238 in the output crossover conduit are closed. The first input pump 212 receives a fluid from a fluid source via the first input manifold 214. The first input pump 212 directs the fluid to the first portion 210*a* of the mixing tub 202. The transport system 206 transports proppant from the hopper 204 to the first portion 210*a* of the mixing tub 202. In implementations where the transport system includes the first auger 206*a* and the second auger 206*b*, the proppant is transported to the mixing tub 202 by the first auger 206*a*. The first chemical pump 240 delivers a chemical additive to the first portion 210*a* of the mixing tub 202. The fluid, the proppant, and the chemical additive are combined in the first portion 210*a* of the mixing tub 202 to form a fracture treatment fluid. The first output pump 224 directs the fracture treatment fluid from the first portion 210*a* of the mixing tub 202, through the first output manifold 226 and to the at least one first wellbore 228. During operation in the third mode, the second input pump, the second chemical pump 242, the second output pump 230, and the second auger 206*b* are deactivated. These components are reserved as back up resources in the example blender system 200.

Figure 5:
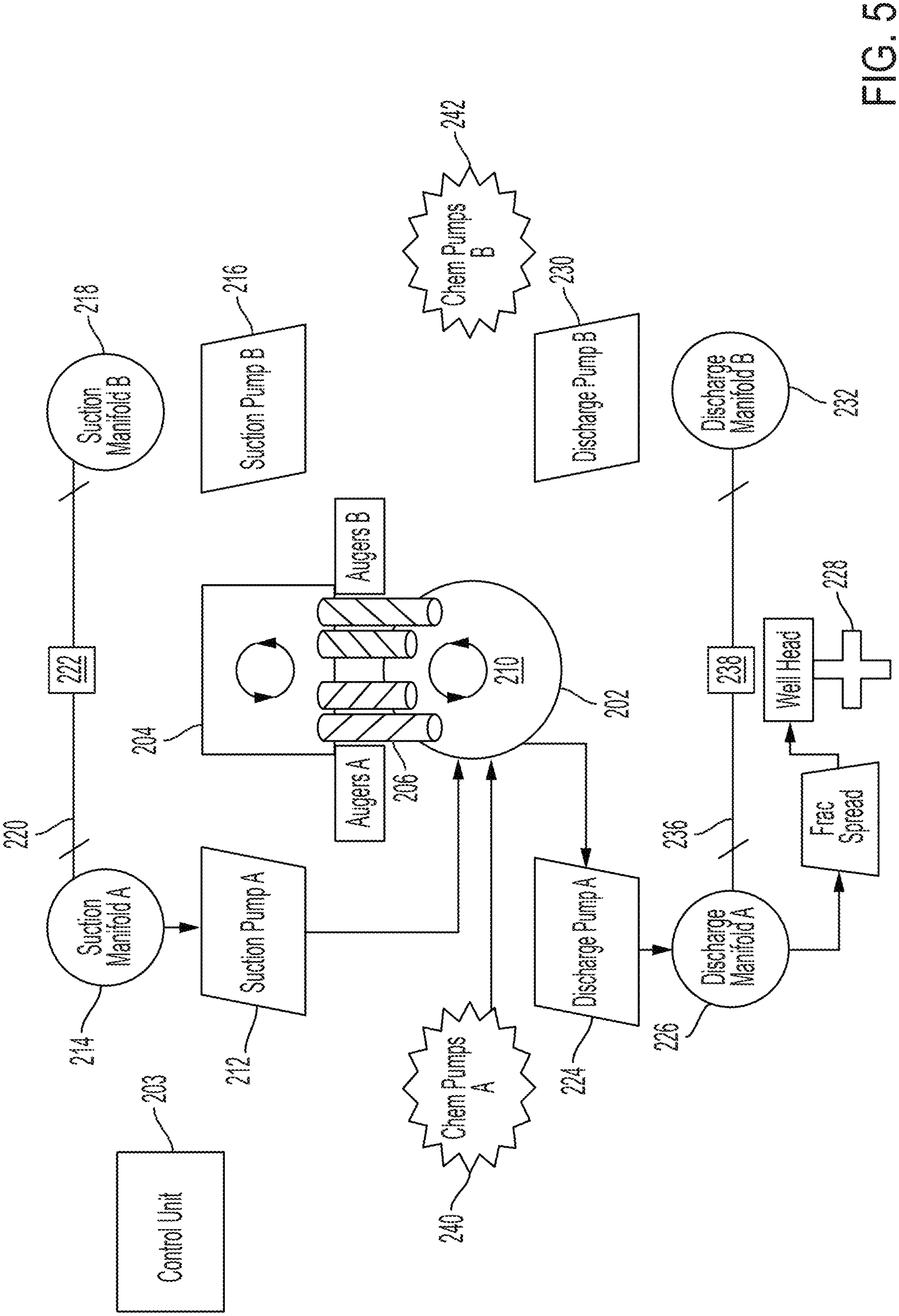
FIG. 5 is a schematic diagram of an example blender system in a fourth mode of operation.

FIG. 5 is a schematic diagram of the example blender system 200 in a fourth mode of operation. During operation of the example blender system 200 in the fourth mode of operation, the divider 208 and the second divider 207 are moved to the open position and the valve 222 in the input crossover conduit 220 and the valve 238 in the output crossover conduit are closed. The first input pump 212 receives a fluid from a fluid source via the first input manifold 214. The first input pump 212 directs the fluid to the interior volume 210 of the mixing tub 202. The transport system 206 transports proppant from the hopper 204 to the interior volume 210 of the mixing tub 202. In implementations where the transport system includes the first auger 206*a* and the second auger 206*b*, the proppant is transported to the mixing tub 202 by one or both of the first auger 206*a* and the second auger 206*b*. The first chemical pump 240 delivers a chemical additive to the interior volume 210 of the mixing tub 202. The fluid, the proppant, and the chemical additive are combined in the interior volume 210 of the mixing tub 202 to form a fracture treatment fluid. The first output pump 224 directs the fracture treatment fluid from the interior volume 210 of the mixing tub 202, through the first output manifold 226 and to the at least one first wellbore 228. During operation in the fourth mode, the second input pump, the second chemical pump 242, the second output pump 230, and the second auger 206*b* are deactivated. These components are reserved as back up resources in the example blender system 200.

Multiple factors may influence the determination of whether the example blender system 200 operates in the first mode, the second mode, the third mode, or the fourth mode. One such factor is the fracture treatment fluid chemistry required at each wellbore. For example, multiple wellbores in close proximity that require different chemistries of fracture treatment fluids will typically lead to a determination to operate the example blender system 200 in the first mode. Similarly, multiple wellbores requiring the same fracture treatment fluid chemistry will typically lead to a determination to operate the example blender system 200 in the second mode. Another factor is the required fracture treatment fluid flow rate. Wellbore formations requiring a higher flow rate of fracture treatment fluid would be likely to utilized the second mode or the fourth mode while wellbore formations requiring a comparatively lower flow rate of fracture treatment fluid would be likely to utilize the third mode. Moreover, the example blender system 200 may, in various implementations facilitate independent control of input flow rates and output flow rates. That is the input flow rate from the first input pump 212 may be controlled independently from the input flow rate of the second input pump 216. Likewise, the output flow rate from the first output pump 224 may be controlled independently from the output flow rate from the second output pump 230.

Additional factors that may influence the determination of whether the example blender system 200 operates in the first mode, the second mode, the third mode, or the fourth mode. For example, well site limitations and space constraints may limit the amount of equipment that can be staged at a well site. In such a scenario, the example blender system 200 may be operated in, for example, the first mode or the second mode in an effort to reduce the amount of equipment present at the well site. Additionally, the example blender system 200 provides operational redundancy in the event of equipment failure or unanticipated well response. For instance, if during operation, the first input pump 212 fails, the valve 222 in the input crossover conduit 220 may be opened to allow the second input pump 216 to receive fluid from the first input manifold 214. Such a scenario could also be utilized if, during operation, the required flow rate of fluid into a well unexpectedly changes. Finally, customer requirements and economic considerations may also influence the determination of whether to operate the example blender system 200 in the first mode, the second mode, the third mode, or the fourth mode.

Additionally, the input crossover conduit 220 and the output crossover conduit 236 facilitate flexibility in arranging the hydraulic fracturing system. For example, hydraulic fracturing systems that are established in a space-constrained area may elect to use a single fluid source and transfer fluid from the first input manifold 214 to the second input manifold 218 via the input crossover conduit 220. The input crossover conduit 220 also facilitates use of the 200 blender system 200 in situations where the fluid source is accessible to only one of the first input pump 212 or the second input pump 216. Similarly, the output crossover conduit 236 facilitates use of the example blender system 200 in situations where a wellbore is accessible only from one of the first output manifold 226 or the second output manifold 232.

Figure 6:
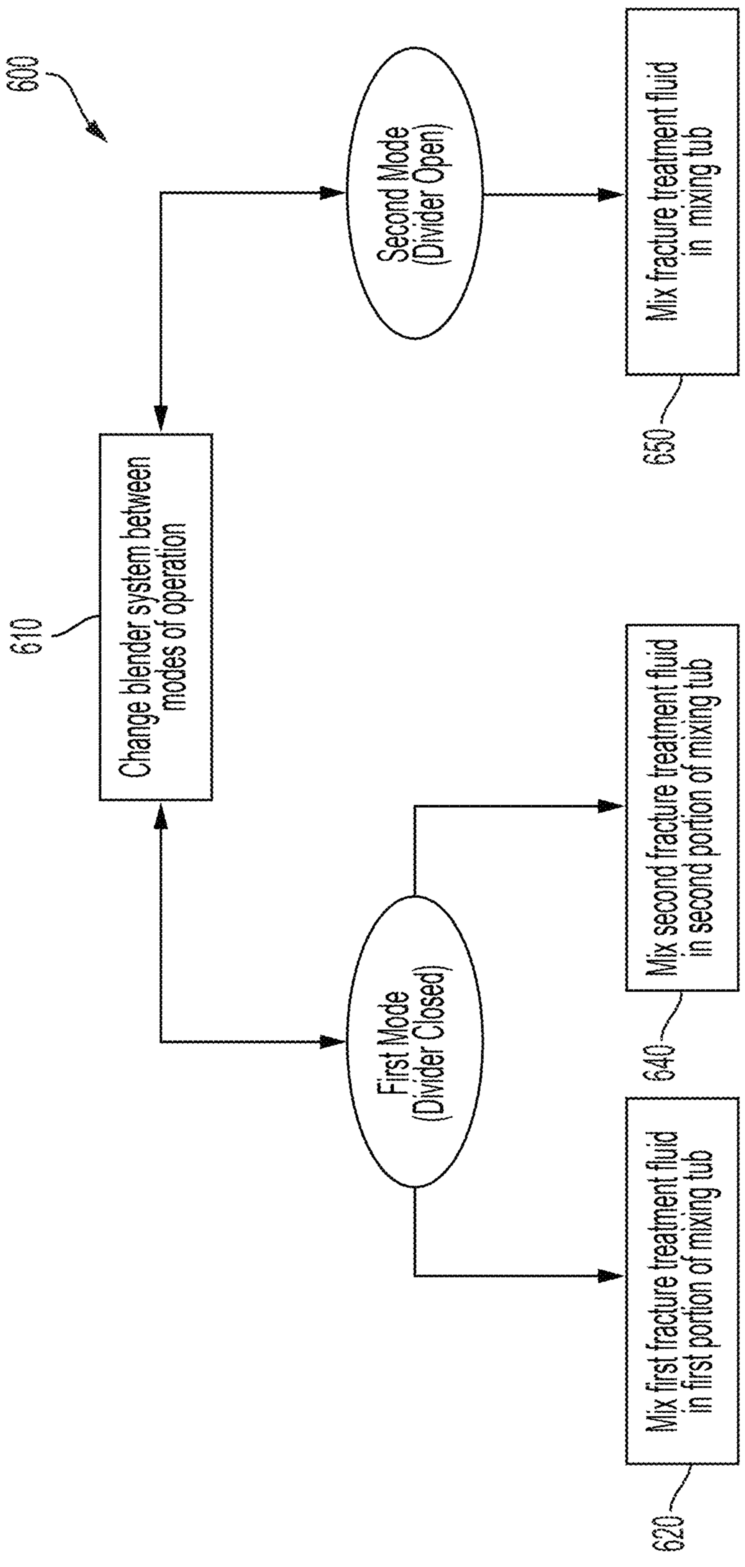
FIG. 6 is a flow diagram of an example process for operating a blender system.

FIG. 6 is a flow diagram of an example process 600 for operating a blender system. In various implementations, the blender system is the example blender system 200 discussed above with respect to FIGS. 2-5 or another type of blender system. The example process 600 may include additional or different operations, and the operations may be performed in the order shown or in another order. In some cases, one or more operations may be repeated, omitted, or performed in another manner.

At 610, a mode of operation of a blender system is selected. In various implementations, selecting the mode of operation of the blender system may include positioning a divider in a mixing tub in a closed position or in an open position. In various implementations, the divider may be the divider 208 described above in FIGS. 2-5 or another divider. The mixing tub may be the mixing tub 202 described above in FIGS. 2-5 or another mixing tub. In a first mode of operation, the divider is positioned in the closed position, which divides an internal volume of the mixing tub into a first portion and a second portion and prevents mixing or interaction of fluids present on a first side of the divider with fluids present on a second side of the divider. In a second mode of operation, the divider is placed in the open position, and fluid in the first portion of the mixing tub is allowed to mix with fluid in the second portion of the mixing tub.

At 620, when the blender system is operated in the first mode with the divider in the closed position, a first fracture treatment fluid is mixed in a first portion of the mixing tub. In various implementations, the first fracture treatment fluid is prepared by delivering a first fluid to the mixing tub via a first input pump. In various implementations, the first input pump may be, for example, the first input pump 212 described in FIGS. 2-5 or another input pump. Proppant is added to the fluid in the first portion from a hopper by a transport system. In various implementations, the transport system may be, for example, the transport system 206 described in FIGS. 2-5 or another transport system. The hopper may be, for example, the hopper 204 described in FIGS. 2-5 or another hopper. Chemical additives are added via a chemical pump. In various implementations, the chemical pump may be the first chemical pump 240 or another chemical pump. The first fracture treatment fluid is then delivered to at least one wellbore via an output pump. In various implementations, the output pump may be, for example, the first output pump 224 described in FIGS. 2-5 or another output pump. The wellbore may be the at least one first wellbore 228 described above in FIGS. 2-5 or another wellbore.

At 640, when the blender system is operated in the first mode with the divider in the closed position, a second fracture treatment fluid is mixed in a second portion of the mixing tub. In various implementations, the second fracture treatment fluid is prepared by delivering a second fluid to the mixing tub via a second input pump. In various implementations, the second input pump may be, for example, the second input pump 216 described in FIGS. 2-5 or another input pump. Proppant is added to the fluid in the second portion from a hopper by a transport system. Chemical additives are added via a chemical pump. In various implementations, the chemical pump may be the second chemical pump 242 or another chemical pump. The second fracture treatment fluid is then delivered to at least one wellbore via an output pump. In various implementations, the output pump may be, for example, the second output pump 230 described in FIGS. 2-5 or another output pump. The wellbore may be the at least one second wellbore 234 described above in FIGS. 2-5 or another wellbore.

At 650, when the blender system is operated in the second mode with the divider in the open position, a fracture treatment fluid is mixed in the mixing tub 202.

Mixing the fracture treatment fluid includes delivering a fluid via an input pump. In various implementations, the input pump may be one or both of the first input pump 212, the second input pump 216, or another input pump. A proppant is added to the mixing tub 202 by the transport system. Chemical additives are added to the mixing tub by a chemical pump. In various implementations, the chemical pump may be one or both of the first chemical pump 240 or the second chemical pump 242. The fracture treatment fluid is removed from the mixing tub 202 and transported to a wellbore via an output pump. In various implementations, the output pump may be one or both of the first output pump 224 or the second output pump 230.

In a first example, aspects of the disclosure relate to a blender system for use in a hydraulic fracturing system. The blender system includes a mixing tub having an interior volume. A movable divider is associated with the mixing tub. The divider is movable between an open position, in which the mixing tub allows liquid flow between a first portion of the interior volume and a second, distinct portion of the interior volume and a closed position, in which the divider prevents liquid flow between the first and second portions of the interior volume. A divider control system moves the divider between the open and closed positions. A first input pump pumps fluid into the first portion of the interior volume of the mixing tub. A first output pump pumps fluid from the first portion of the interior volume of the mixing tub. A second input pump pumps fluid into the second portion of the interior volume of the mixing tub. A second output pump pumps fluid from the second portion of the interior volume of mixing tub.

In some aspects, implementations of the first example include a first input manifold that provides fluid to the first input pump and a second input manifold that provides fluid to the second input pump. An input crossover conduit between the first input manifold and the second input manifold. A first output manifold receives fluid from the first output pump. A second output manifold receives fluid from the second output pump. An output crossover conduit between the first output manifold and the second output manifold. In some implementations, the first input manifold is fluidly coupled to a first fluid source, and the second input manifold is fluidly coupled to a second fluid source. In other implementations, the first input manifold is fluidly coupled to a first fluid source, and the second input manifold draws fluid supplied by the first fluid source into the second input manifold via the input crossover conduit. In some implementations, In some implementations, the first output manifold is fluidly coupled to a first wellbore, and the second output manifold is fluidly coupled to a second wellbore. In other implementations, the first output manifold and the second output manifold are fluidly coupled to a first wellbore.

In some aspects, implementations of the first example include that when the divider is in the closed position, fluid in the first portion of the interior volume is blocked from mixing with fluid in the second portion of the interior volume.

In some aspects, implementations of the first example include a transport system that transports proppant from a hopper to the mixing tub. In some implementations, the transport system includes a first auger that transports the proppant to the first portion of the interior volume and a second auger that transports the proppant to the second portion of the interior volume. Such implementations may also include a second movable divider associated with the hopper. The second divider is movable between an open position, in which the hopper allows proppant to move between a first portion of the hopper and a second, distinct portion of the hopper and a closed position, in which the second divider prevents proppant from moving between the first portion and the second portion of the hopper. In such implementations, the first auger may be disposed on a first side of the second divider and transport the proppant from the first portion of the hopper, and the second auger may be disposed on a second, opposite side of the second divider and transport the proppant from the second portion of the hopper.

In some aspects, implementations of the first example may include a first chemical pump that pumps a chemical additive into the first portion of the interior volume, and a second chemical pump that pumps a chemical additive into the second portion of the interior volume.

In a second example, aspects of the disclosure relate to a method of blending fracture treatment fluids for hydraulic fracture treatments. The method includes moving a divider associated with a mixing tub of a blender system. The mixing tub includes an interior volume, and the divider is moved from an open position, in which the mixing tub allows liquid to flow between a first portion of the interior volume and a second, distinct portion of the interior volume, and a closed position, in which the divider prevents liquid flow between the first and second portions of the interior volume. While the divider is in the closed position, fluid is pumped by operation of a first input pump into the first portion of the interior volume. A first fracture treatment fluid is mixed in the first portion of the interior volume. The first fracture treatment fluid is pumped by operation of a first output pump from the first portion of the interior volume. Fluid is pumped by operation of a second input pump into the second portion of the interior volume. A second fracture treatment fluid is mixed in the second portion of the interior volume. The second fracture treatment fluid is pumped by operation of a second output pump from the second portion of the interior volume.

In some aspects, implementations of the second example include controlling an input flow rate of the first input pump independently from an input flow rate of the second input pump, and controlling an output flow rate of the first output pump independently from an output flow rate of the second output pump.

In some aspects, implementations of the second example include transporting proppant from a hopper to the mixing tub. In such implementations, the transportation of the proppant to the first portion of the interior volume is by operation of a first auger, and the transportation the proppant to the second portion of the interior volume is by operation of a second auger. Such aspects may include moving a second divider associated with the hopper. The second divider may be moved from a closed position, in which the second divider prevents proppant from moving between a first portion of the hopper and a second portion of the hopper, and an open position, in which the hopper allows proppant to move between the first portion and the second portion of the hopper. In such aspects the first auger transports the proppant from the first portion of the hopper, and the second auger transports the proppant from the second portion of the hopper.

In some aspects, implementations of the second example include moving the divider from the closed position to the open position. While the divider is in the open position, pumping fluid into the interior volume by operation of at least one of the first input pump and the second input pump. A third fracture treatment fluid is mixed in the first and second portions of the interior volume. The third fracture treatment fluid is pumped from the interior volume by operation of at least one of the first output pump and the second output pump.

In a third example, aspects of the disclosure relate to a method of blending fracture treatment fluids for hydraulic fracture treatments. The method includes operating a blender unit in a first mode of operation. Operating the blender unit in the first mode of operation includes mixing a first fracture treatment fluid in a first portion of a mixing tub and mixing a second fracture treatment fluid in a second, distinct portion of the mixing tub. A divider in the mixing tub prevents the first fracture treatment fluid from mixing with the second fracture treatment fluid during the first mode of operation. The divider may be moved to change between the first mode of operation and a second mode of operation. The blender unit is operated in the second mode of operation. Operating the blender unit in the second mode of operation includes mixing a third fracture treatment fluid in the first and second portions of the mixing tub. The third fracture treatment fluid flows between the first portion of the mixing tub and the second portion of the mixing tub during the second mode of operation.

In some aspects, implementations of the third example include, while operating the blender unit in the second mode of operation, supplying the third fracture treatment fluid to a first well head and a second well head simultaneously. Such implementations may also include supplying the first fracture treatment fluid to the first well head while simultaneously supplying the second fracture treatment fluid to the second well head.

In some aspects, implementations of the third example include operating the blender unit in the first mode of operation before operating the blender unit in the second mode of operation and moving the divider includes moving the divider from a closed position to an open position.

In some aspects, implementations of the third example include operating the blender unit in the second mode of operation before operating the blender unit in the first mode of operation, and moving the divider comprises moving the divider from an open position to a closed position.

In some aspects, implementations of the third example include, when operating the blender unit in the first mode of operation, pumping fluid into the first portion of the mixing tub by operation of a first input pump. The first fracture treatment fluid is pumped from the first portion of the mixing tub by operation of a first output pump. Fluid is pumped into the second portion of the mixing tub by operation of a second input pump. The second fracture treatment fluid is pumped from the second portion of the mixing tub by operation of a second output pump. In such implementations, operating the blender unit in the second mode of operation includes pumping fluid into the first portion and the second portion of the mixing tub by operation of at least one of the first input pump and the second input pump, and, pumping the third fracture treatment fluid from the first portion and the second portion of the mixing tub by operation of at least one of the first output pump and the second output pump.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A blender system for use in a hydraulic fracturing system, the blender system comprising:
- a mixing tub comprising an interior volume;
- a movable divider associated with the mixing tub, wherein the divider is movable between:
  - an open position, in which the mixing tub allows liquid flow between a first portion of the interior volume and a second, distinct portion of the interior volume; and
  - a closed position, in which the divider prevents liquid flow between the first and second portions of the interior volume;
- a divider control system that moves the divider between the open and closed positions;
- a first input pump that pumps fluid into the first portion of the interior volume of the mixing tub;
- a first output pump that pumps fluid dispensed from the first portion of the interior volume of the mixing tub;
- a second input pump that pumps fluid into the second portion of the interior volume of the mixing tub; and
- a second output pump that pumps fluid dispensed from the second portion of the interior volume of mixing tub.

2. The blender system of claim 1, comprising:
- a first input manifold that provides fluid to the first input pump;
- a second input manifold that provides fluid to the second input pump;
- an input crossover conduit between the first input manifold and the second input manifold;
- a first output manifold that receives fluid from the first output pump;
- a second output manifold that receives fluid from the second output pump; and
- an output crossover conduit between the first output manifold and the second output manifold.

3. The blender system of claim 2, wherein the first input manifold is fluidly coupled to a first fluid source, and the second input manifold is fluidly coupled to a second fluid source.

4. The blender system of claim 2, wherein the first input manifold is fluidly coupled to a first fluid source, and the second input manifold draws fluid supplied by the first fluid source into the second input manifold via the input crossover conduit.

5. The blender system of claim 2, wherein the first output manifold is fluidly coupled to a first wellbore, and the second output manifold is fluidly coupled to a second wellbore.

6. The blender system of claim 2, wherein the first output manifold and the second output manifold are fluidly coupled to a first wellbore.

7. The blender system of claim 1, wherein, when the divider is in the closed position, fluid in the first portion of the interior volume is blocked from mixing with fluid in the second portion of the interior volume.

8. The blender system of claim 1, comprising a transport system that transports proppant from a hopper to the mixing tub.

9. The blender system of claim 8, wherein the transport system comprises a first auger that transports the proppant to the first portion of the interior volume and a second auger that transports the proppant to the second portion of the interior volume.

10. The blender system of claim 9, comprising a second movable divider associated with the hopper, wherein the second divider is movable between:
- an open position, in which the hopper allows proppant to move between a first portion of the hopper and a second, distinct portion of the hopper; and
- a closed position, in which the second divider prevents proppant from moving between the first portion and the second portion of the hopper.

11. The blender system of claim 10, wherein:
- the first auger is disposed on a first side of the second divider and transports the proppant from the first portion of the hopper; and
- the second auger is disposed on a second, opposite side of the second divider and transports the proppant from the second portion of the hopper.

12. The blender system of claim 1, comprising:
- a first chemical pump that pumps a chemical additive into the first portion of the interior volume; and
- a second chemical pump that pumps a chemical additive into the second portion of the interior volume.

13. The blender system of claim 1, wherein the divider control system comprises a hand crank.

14. A method of blending fracture treatment fluids for hydraulic fracture treatments, the method comprising:
- moving a divider associated with a mixing tub of a blender system, wherein the mixing tub comprises an interior volume, and the divider is moved from:
  - an open position, in which the mixing tub allows liquid to flow between a first portion of the interior volume and a second, distinct portion of the interior volume; and
  - a closed position, in which the divider prevents liquid flow between the first and second portions of the interior volume;
- while the divider is in the closed position:
  - by operation of a first input pump, pumping fluid into the first portion of the interior volume;

mixing a first fracture treatment fluid in the first portion of the interior volume;

by operation of a first output pump, pumping the first fracture treatment fluid from the first portion of the interior volume;

by operation of a second input pump, pumping fluid into the second portion of the interior volume;

mixing a second fracture treatment fluid in the second portion of the interior volume; and by operation of a second output pump, pumping the second fracture treatment fluid from the second portion of the interior volume.

15. The method of claim 14, further comprising:

controlling an input flow rate of the first input pump independently from an input flow rate of the second input pump; and controlling an output flow rate of the first output pump independently from an output flow rate of the second output pump.

16. The method of claim 14, further comprising transporting proppant from a hopper to the mixing tub.

17. The method of claim 16, wherein transporting the proppant comprises:

transporting the proppant to the first portion of the interior volume by operation of a first auger; and transporting the proppant to the second portion of the interior volume by operation of a second auger.

18. The method of claim 17, comprising moving a second divider associated with the hopper, wherein the second divider is moved from:

a closed position, in which the second divider prevents proppant from moving between a first portion of the hopper and a second portion of the hopper; and an open position, in which the hopper allows proppant to move between the first portion and the second portion of the hopper.

19. The method of claim 18, wherein:

the first auger transports the proppant from the first portion of the hopper; and the second auger transports the proppant from the second portion of the hopper.

20. The method of claim 14, comprising:

moving the divider from the closed position to the open position; and while the divider is in the open position:

by operation of at least one of the first input pump and the second input pump, pumping fluid into the interior volume;

mixing a third fracture treatment fluid in the first and second portions of the interior volume; and by operation of at least one of the first output pump and the second output pump, pumping the third fracture treatment fluid from the interior volume.

21. A method of blending fracture treatment fluids for hydraulic fracture treatments, the method comprising:

operating a blender unit in a first mode of operation, wherein operating the blender unit in the first mode of operation comprises:

mixing a first fracture treatment fluid in a first portion of a mixing tub of the blender unit; and mixing a second fracture treatment fluid in a second, distinct portion of the mixing tub, wherein a divider in the mixing tub prevents the first fracture treatment fluid from mixing with the second fracture treatment fluid during the first mode of operation;

moving the divider to change between the first mode of operation and a second mode of operation; and operating the blender unit in the second mode of operation, wherein operating the blender unit in the second mode of operation comprises mixing a third fracture treatment fluid in the first and second portions of the mixing tub, wherein the third fracture treatment fluid flows between the first portion of the mixing tub and the second portion of the mixing tub during the second mode of operation.

22. The method of claim 21, comprising, while operating the blender unit in the second mode of operation, supplying the third fracture treatment fluid to a first well head and a second well head simultaneously.

23. The method of claim 22, comprising, while operating the blender unit in the first mode of operation, supplying the first fracture treatment fluid to the first well head while simultaneously supplying the second fracture treatment fluid to the second well head.

24. The method of claim 21, comprising operating the blender unit in the first mode of operation before operating the blender unit in the second mode of operation, wherein moving the divider comprises moving the divider from a closed position to an open position.

25. The method of claim 21, comprising operating the blender unit in the second mode of operation before operating the blender unit in the first mode of operation, wherein moving the divider comprises moving the divider from an open position to a closed position.

26. The method of claim 21, wherein operating the blender unit in the first mode of operation comprises:

by operation of a first input pump, pumping fluid into the first portion of the mixing tub;

by operation of a first output pump, pumping the first fracture treatment fluid from the first portion of the mixing tub;

by operation of a second input pump, pumping fluid into the second portion of the mixing tub; and by operation of a second output pump, pumping the second fracture treatment fluid from the second portion of the mixing tub.

27. The method of claim 26, wherein operating the blender unit in the second mode of operation comprises:

by operation of at least one of the first input pump and the second input pump, pumping fluid into the first portion and the second portion of the mixing tub; and by operation of at least one of the first output pump and the second output pump, pumping the third fracture treatment fluid from the first portion and the second portion of the mixing tub.

28. The method of claim 21, wherein a chemistry of the third treatment fluid is the same as a chemistry of at least one of the first treatment fluid or the second treatment fluid.

* * * * *